US005146612A

United States Patent [19]

Grosjean et al.

[11] Patent Number: 5,146,612

[45] Date of Patent: Sep. 8, 1992

[54] TECHNIQUE FOR USING A SUBCARRIER FREQUENCY OF A RADIO STATION TO TRANSMIT, RECEIVE AND DISPLAY A MESSAGE TOGETHER WITH AUDIO REPRODUCTION OF THE RADIO PROGRAM

[76] Inventors: Jon P. Grosjean, Box 110, Pulpit Rock Rd., S. Woodstock, Conn. 06267; Stuart E. Ross, 22 Capitola Rd., Danbury, Conn. 06811; Daniel J. Semple, 4615 Northwood Rd., Glen Arbor, Mich. 49636

[21] Appl. No.: 697,728

[22] Filed: May 3, 1991

Related U.S. Application Data

[63] Continuation of Ser. No. 339,313, Apr. 17, 1989, abandoned.

[51] Int. Cl.[5] .............................................. H04B 7/00

[52] U.S. Cl. ....................................... 455/45; 455/70; 358/142; 340/792; 340/825.44

[58] Field of Search ..................... 455/45, 59, 70, 158, 455/161; 358/142; 371/57.1, 57.2, 49.1; 370/99; 340/726, 792, 825.44, 311.1

[56] References Cited

U.S. PATENT DOCUMENTS

| | | | |
|---|---|---|---|
| 3,632,863 | 1/1972 | Hirashima | 358/142 |
| 3,825,892 | 7/1974 | Catchpole | 371/57.2 |
| 3,838,444 | 9/1974 | Coughlin et al. | 358/142 |
| 4,281,217 | 7/1981 | Dolby | 455/70 |
| 4,369,443 | 1/1983 | Gialcanza et al. | 455/70 |
| 4,450,589 | 5/1984 | Eilers et al. | 455/45 |
| 4,646,081 | 2/1987 | Tsunoda | 340/792 |
| 4,940,975 | 7/1990 | Ide et al. | 455/343 |
| 4,952,927 | 8/1990 | DeLuca et al. | 340/792 |

*Primary Examiner*—Curtis Kuntz
*Assistant Examiner*—Edward Urban
*Attorney, Agent, or Firm*—Frishauf, Holtz, Goodman & Woodward

[57] ABSTRACT

A message is transmitted on a subcarrier of a main carrier frequency of a radio station. The message is displayed simultaneously with the audible reproduction of the radio program. The message is capable of being displayed dynamically by having different portions thereof sequencing through the display device until the entire message is concluded and/or using a variety of possible display attributes, such as scrolling and flashing. One feature involves scanning the radio band for a station that carries the message. Scanning of a plurality of subcarriers at each station is also performed. One embodiment transmits the message during the "dead time" of other programming normally transmitted on the same subcarrier. The alphanumeric characters of the message are preferably converted prior to transmission into a signal with an average value of zero. The converted characters are decoded at the receiver.

3 Claims, 7 Drawing Sheets

TECHNIQUE FOR USING A SUBCARRIER FREQUENCY OF A RADIO STATION TO TRANSMIT, RECEIVE AND DISPLAY A MESSAGE TOGETHER WITH AUDIO REPRODUCTION OF THE RADIO PROGRAM

This application is a continuation of application Ser. No. 07/339,313, filed Apr. 17, 1989, now abandoned.

BACKGROUND OF THE INVENTION

The present invention is directed to a technique for transmitting a radio message signal on a subcarrier of a main frequency while a radio program is being broadcast and, more particularly, to the display of such a message simultaneously with continuous audible reproduction of the radio program.

Various techniques have been proposed for utilizing the airwaves to communicate not only a radio program to its listeners, but also to convey other programs and information as well. For example, continuous background music, paging signals, and stock market information are carried on subcarrier frequencies. However, those previous approaches have not displayed a "live", i.e. dynamic, message while the audio reproduction of the program continues uninterrupted. Such a "live" message would preferably be of any desired length, but would have to be displayed by multiple number of segments, with the maximum segment length being determined by the size of the display. Previous approaches have used a static display. For example, the Dec. 1988 issue of Radio-Electronics includes on pages 65-68 and 76 an article on a European data system used in conjunction with FM programming. A subcarrier, typically at 57 kHz, is used to carry digital data for display on a radio. The displayed information describes the audio program as being "sports" or "traffic", or it is the name/number of the radio station. As such, the displayed message is static.

It would be highly desirable to continue uninterrupted playing of the radio program while the transmitted message is being dynamically reproduced for viewing by the radio station listener. The radio programming, such as music, can continue uninterrupted while, for example, the traffic conditions are being displayed rather than having to be audibly reproduced. With the system presently in use, traffic announcements, commercials, announcements, news and such cut into the enjoyment of a musical radio program and detract from the continuity of a discussion program, for example. Some radio stations may be reluctant to carry such audible messages knowing full well that the programming for which its sponsors are paying will be interrupted by it. It would be highly advantageous to have a system which can reproduce the message signal for the benefit of the listener but without cutting into the normal program being broadcast by the radio station. Were such a system available, all the parties involved would benefit. Specifically, sponsors of the radio program could feel assured that the program and/or the advertisements for which they are paying would not be interrupted by an emergency announcement, for example. The radio station may find it easier to attract sponsors and, in addition, may succeed in keeping a broader range of listeners including those who are not interested in tuning to an audio program likely to be interrupted. There is also an economic incentive in perhaps receiving revenue for both the regular programming and the message transmission which are occurring at the same time whereas, otherwise, a given interval of time would be devoted to only one of the two. In addition, the listener would be pleased because the enjoyment of the program is maximized due to the lack of interruptions while, at the same time, gaining the flexibility of obtaining a reproduced message signal which is of assistance in, for example, traffic conditions or any of the other types of uses to which such a message signal can be put.

SUMMARY OF THE INVENTION

It is a primary object of the present invention to provide a technique for reproducing a message transmitted on a subcarrier frequency while the audio reproduction of a radio program being broadcast on a main carrier frequency can continue uninterrupted.

Another object of the present invention is to provide a technique for displaying a "live" message along with reproduction of a radio program.

Yet another object of the present invention is to provide a technique for displaying the "live" message under control of the broadcasting station while providing a flexible arrangement to produce the display in a variety of formats.

A further object of the present invention is to provide a technique for transmitting a message which can be selectively controlled for reception by only a particular group of listeners.

Still another object of the present invention is to provide a technique for scanning a radio frequency band and stopping at a station when the existence of a message on a subcarrier thereof is detected.

Yet another object of the present invention is directed to provide a technique for scanning a plurality of subcarrier frequencies at each broadcasting station to determine which one is transmitting a message.

One other object of the present invention is to transmit the message for display on the same subcarrier which is already transmitting other information, such as a continuous music program.

These and other objects of the present invention are attained by apparatus for transmitting and receiving a radio frequency signal, comprising radio program input means for providing a program signal on a main carrier frequency of the main carrier frequency. A data generating means provides a data signal on a subcarrier frequency transmitting means for combining the program signal and the data signal into a composite signal, and for radiating the composite signal. A receiver means receives the radiated composite signal and separates it into a program signal component and a data signal component. A speaker means audibly reproduces the program signal component. A display means dynamically displayes a message corresponding to the data signal component simultaneously with the audible reproduction of the program signal component.

Another aspect of the present invention is directed to apparatus for transmitting and receiving a radio frequency signal, comprising a radio program input means for providing a program signal on a main carrier frequency. A data generating means provides data signals to be transmitted during a plurality of time periods on a subcarrier frequency of the main carrier frequency. It includes: means for sequentially inputting portions of a message, represented by a plurality of input signal blocks, into a queue until the entire message is within the queue, and means for sequentially retrieving the plurality of input signal blocks individually from the queue and introducing all of the plurality of input signal blocks, individually and in turn, into the respective data signals transmitted during the plurality of time periods. A transmitting means combines the program signal and the data signals into a composite signal, and radiates the composite signal. A receiver means receives the radiated composite signal and separates it into a program signal component and a data signal component. A speaker means is coupled to the receiver means for audibly reproducing the program signal component. A display means is coupled to the receiver means for displaying, simultaneously with the audible reproduction of the program signal component, all of the message portions, in turn, as data signals having the respective plurality of input signal blocks incorporated therein are received by the receiver means.

One other aspect of the present invention is directed to apparatus for transmitting and receiving a radio frequency signal, comprising radio program input means for providing a program signal on a main carrier frequency. A data generating means provides data signals to be transmitted during a plurality of time periods on a subcarrier frequency of the main carrier frequency. It includes: means for storing portions of a message, represented by a plurality of input signal blocks, so that the entire message is stored, and means for retrieving the plurality of input signal blocks individually in an ordered sequence from the beginning of the message to its end and introducing all of the plurality of input signal blocks, individually and in turn, into the respective data signals transmitted during the plurality of time periods. Transmitting means, receiver means, speaker means, and display means are provided as already explained above.

Yet another aspect of the present invention is directed to apparatus for transmitting and receiving a radio frequency signal, comprising radio program input means for providing a program signal on a main carrier frequency. A data generating means provides a data signal on a subcarrier frequency of the main carrier frequency. It includes: means for generating input signals having an average DC voltage level normally greater than zero, mean for encoding the input signals to provide coded signals having an average DC voltage of substantially zero over a predetermined period of time, and means responsive to the coded signals for generating the data signal. A transmitting means combines the program signal and the data signal into a composite signal, and radiates the composite signal. A receiver means receives the radiated composite signal and separates it into a program signal component and a data signal component. A means isprovided for decoding the data signal component. A speaker means audibly reproduces the program signal component. A display means displayes a message corresponding to the decoded data signal component simultaneously with the audible reproduction of the program signal component.

A further aspect of the present invention is directed to apparatus for transmitting and receiving a radio frequency signal, comprising radio program input means for providing a program signal on a main carrier frequency. Information signal generating means provides an information signal normally continuously transmitted on a subcarrier frequency of the main carrier frequency, except for given time intervals. A data generating means provides a data signal to be transmitted on the subcarrier frequency and includes: first means for determining the given time intervals when the information signal is not transmitted on the subcarrier frequency, and means for transmitting the data signal over the subcarrier frequency during the given time intervals. A transmitting means normally combines the program signal and the information signal into a first composite signal, and it combines the program signal and the data signal only during at least a portion of the given time intervals to form a second composite signal. A receiver means receives the first and second radiated composite signals and separates them into a program signal component, a first subcarrier frequency component, and a second subcarrier frequency component. A second means determines the given time intervals when the information signal is not present on the subcarrier frequency component. A speaker means audibly reproduces the program signal component and the first subcarrier frequency component. A means is provided for inhibiting the speaker means during at least a portion of the given time intervals. A display means displayes a message corresponding to the data signal in the second subcarrier frequency component simultaneously with the audible reproduction of the program signal component.

DETAILED DESCRIPTION OF THE PREFERRED EMBODIMENT

Figure 1:
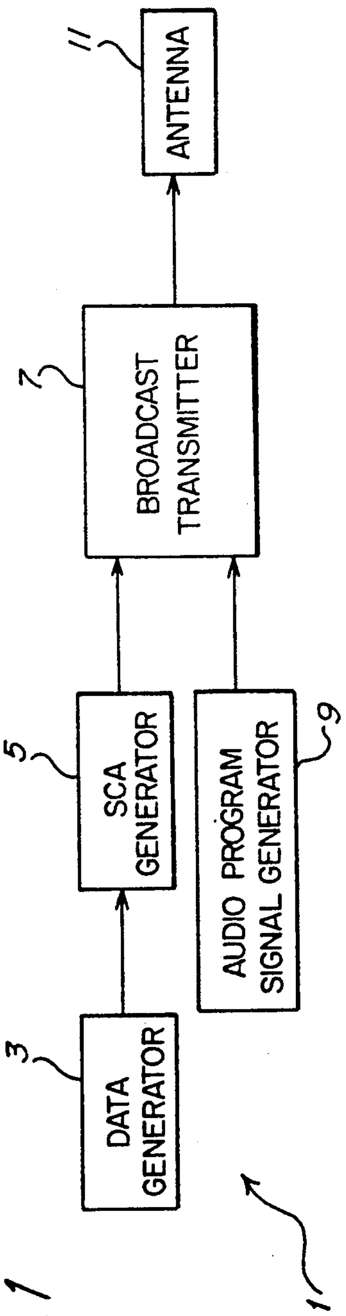
FIG. 1 is a block diagram showing a transmitter arranged in accordance with the present invention.

As shown by the block diagram depicted in FIG. 1, transmitter 1 includes data generator 3 which is used to provide a selected message to be transmitted over a subcarrier frequency. Although the invention is usable with the AM band, it will be disclosed below specifically with respect to the FM band. Currently, FM radio stations broadcast primary programming on a main carrier frequency (also called main channel), and other signals are broadcast using SCA (Sub-Carrier Authorization) carrier frequencies centered usually around 57, 67, 76 and 92 KHz. Since each SCA carrier uses approximately 5 to 10% of the transmitter power, radio stations usually use no more than two SCA carriers in order to retain sufficient power for the main channel.

Data generator 3 is used to not only input the desired message, but it also provides control signals that are required for both transmission and reception of the message. For example, at the transmission end, such control signals determine the repetition frequency at which the message is cyclically transmitted, identifies a particular group of listeners for whom the message is directed to the exclusion of all others, etc. For the reception end, such control signals determine whether the displayed message is to be static, scrolling, flashing, etc. It is seen that these control signals set various attributes of the message. Thus, the terms "control" and "attribute" are used interchangeably hereinbelow. More details on the data generation aspect of the invention are provided below.

Data generator 3 provides at its output a signal, preferably digital, (called "data signal" hereinbelow) which is input to SCA generator 5 of a conventional design, such as product SCA-300 available from Circuit Research Laboratories. SCA generator 5 provides a selected SCA carrier and modulates it by the output of data generator 3. The modulated SCA carrier is combined in FM broadcast transmitter 7 (also conventional) with the program carried on the main channel as generated by audio program signal generator 9. The resulting composite signal is radiated by antenna 11.

The message and attribute signals produced by data generator 3 can be in the form of ASCII characters. However, data generator 3 preferably converts the ASCII values to a binary output with an average voltage of 0. Doing so has the advantage of encrypting the message to block use of the system by unauthorized receivers. Also, it allows the signal to be transmitted on SCA generators which have an AC coupled input circuit or require 0 volts DC average. As explained below in greater detail, an encoding technique converts the ASCII characters such that, over a reasonable amount of time, approximately the same number of ones and zeros are provided at the output of data generator 3.

Figure 2:
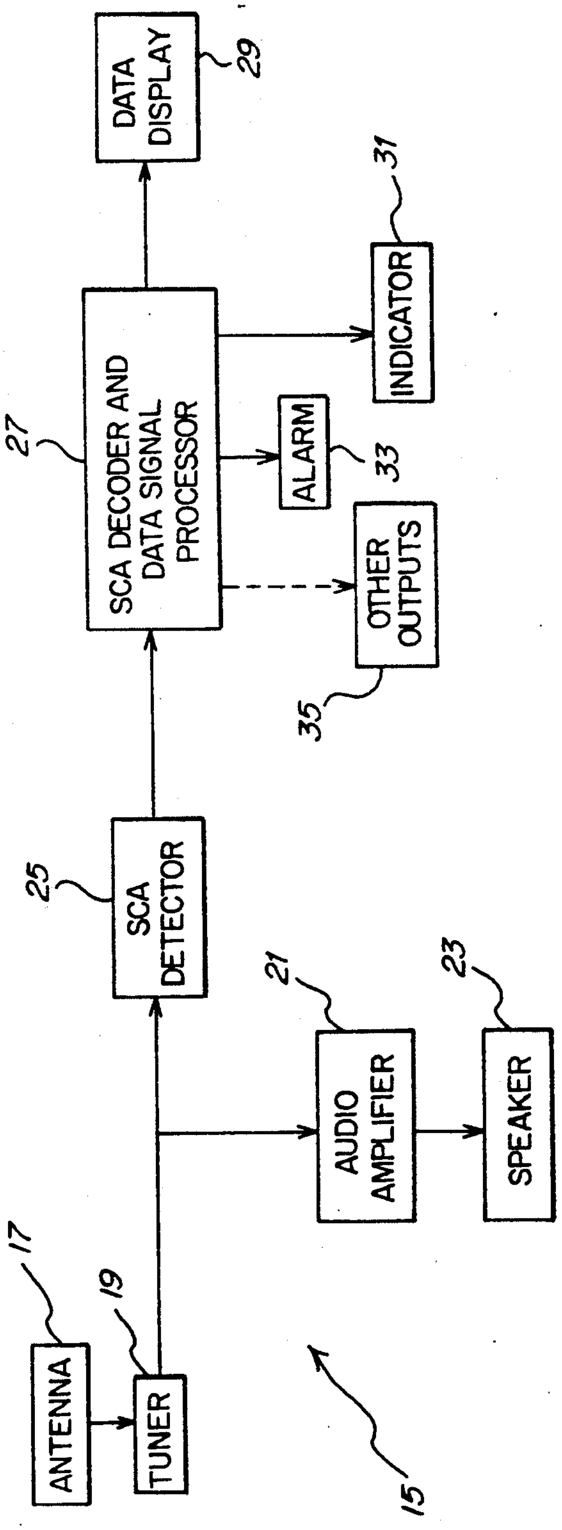
FIG. 2 is a block diagram of a receiver arranged in accordance with the present invention.

The signal radiated by antenna 11 is detected by receiver 15 depicted in FIG. 2. Antenna 17 provides the detected signal to FM tuner 19. The thus detected composite signal output by FM tuner 19 is then split. The modulated main carrier is input to audio amplifier 21 for audible reproduction on speaker 23 in the conventional manner. However, the composite signal is also input to SCA detector 25 which separates the SCA carrier from the composite signal. SCA detector 25 is conventional in that it includes a bandpass or high pass filter to reject the main carrier, and an EXAR XR2211 phase lock loop circuit to demodulate the SCA carrier signal and produce a digital signal at the output of SCA detector 25. The digitized output signal is input to SCA decoder and data signal processor 27 (called "decoder 27" hereinafter). Decoder 27 is preferably a Zilog Z8 microcontroller which processes the thus separated signal to determine its message content as well as whatever control signals were radiated from transmitter 1. The message is then shown on display 29 with the attributes set by the decoded control signals. Display 29 can be an AND 501 or an OPTREX DMC-20215. It is a two-line device having a capacity of 20 characters per line.

Indicator 31 is useful to alert the listener to the fact that the station to which the radio is tuned is generating a data signal. Thus, as the listener is turning a knob to manually scan for a station operating with an SCA carrier transmitting a data signal, decoder 27 detects a characteristic of the data signal (discussed in detail below) and actuates indicator 31 so that the listener knows to immediately stop further scanning of the FM band. Indicator 31 can take the form of an LED device. An available option is to provide an alarm device 33 which is activated by decoder 27 when a certain type of message is received. Thus, a volunteer fireman can be called to duty with a buzzer sounded by his radio. Other outputs 35 of decoder 27 can be contemplated such as controlling any desired electrical load, such as a light.

While decoder 27 is generating its output signals and actuating devices such as 29, 33 and 35, the conventional audible reproduction of the radio program continues uninterrupted. In particular, this occurs even while a message and its associated control signals are detected, processed and displayed. Thus, a simultaneous display of the message along with audible reproduction of the program takes place. The program is, thus, not subject to discontinuity so that the listener can get full enjoyment from the programming while, at the same time, being able to take advantage of the information shown on display 29.

Data generator 3 is preferably embodied in the form of a personal computer ("PC" hereinafter). The PC is provided with suitable software to generate a desired message. This can be in the nature of a wordprocessing program with typical function select features, alphanumeric character entry, text editing, and similar capabilities. The messages can be prestored for selection by the user, or they can actually be input by the user. No further details about such software are deemed necessary. The PC is also utilized to generate the control signals, i.e. attributes. The attributes can, for example, be stored in the PC and made available to the user for selection in a displayed table or by a menu-driven approach.

In the arrangement contemplated by the present invention, one message line is generated by the PC. Since display 29 can accommodate a maximum of 20 characters, a message line cannot exceed 20 characters in length. Data display 29 is of the two-line type. Thus, a maximum of two lines can be displayed simultaneously on it. Each message line generated by the PC is provided with its own set of attributes which are selected by the user (i.e. the radio station operator). These attributes determine how the message is transmitted and how it is eventually displayed by receiver 15. A great deal of flexibility is afforded to the user for maximizing the impact and utility of the message, and for directing it for the maximum benefit of the listener. A list of exemplary attributes is provided below.

TRANSMIT TIME—This is the time, in seconds, for which the current message line will be transmitted by the PC. Depending upon the selected display attributes, it is roughly equivalent to the length of time the message line would appear on the display 29.

DISPLAY LINE—This is the target line of the display where the text will appear. In a two-line display, the top or the bottom line may be selected.

LOAD MODE—The load mode may be set to either "NORMAL" or "PUSH". If "PUSH" mode is selected, the existing text in the target line of display 29 is "pushed" into the other display line where it replaces what was displayed there before. This mode can be used to create a vertical scrolling effect similar to scanning up or down a page of text while exposing only two lines at a time. If the "NORMAL" mode is selected, the other display line is not affected by the load operation.

CLEAR-ON-LOAD—The target display line is erased before the just-transmitted text is loaded into display 29. If this attribute is not selected, then the existing text data remains and will be affected by whatever load operations are specified (see below).

SCROLL-ON-LOAD—The newly transmitted text is shifted one character at a time into the target display line. The speed and direction of the scrolling is set using the DIRECTION and SCROLL SPEED attributes (see below). If not selected, the characters of the new text simply appear on the target display line simultaneously.

SPLIT-ON-LOAD—The just-transmitted text is loaded into the display 29 starting with the two center characters of the target line and proceeding outward to the two ends of the display line. The characters are written into the display two at a time at the speed specified by SCROLL SPEED (see below). If the SCROLL UNLOAD attribute is additionally set, the message will scroll out of the center as two halves.

SCROLL DISPLAY—The text in the target display line will be shifted while it is being displayed according to the DIRECTION and SCROLL SPEED attributes.

FLASH DISPLAY—The text will flash on and off at the rate selected by the EFFECTS SPEED attribute.

FLASH-ON-LOAD—The text will flash on and off at the rate selected by the EFFECTS SPEED attribute, but only while it is being loaded as, for example, with a SCROLL-ON-LOAD attribute.

DIRECTION—Determines whether the text will scroll to the left or to the right. While a text is displayed, it scrolls off one side of the display line and back onto the other side of the display line.

SCROLL SPEED—Determines the scrolling speed of the display line for both SCROLL UNLOAD and SCROLL DISPLAY.

EFFECTS SPEED—Determines how fast the text will flash on and off when the FLASH DISPLAY attribute is set. This speed attribute will also be used for other effects to be implemented in the future.

The data signal generated by the PC includes more than just the message signal and the control signal relevant to selection of the desired attributes. The data signal is generated, transmitted, and received in a block oriented protocol. In other words, the data signal is arranged into blocks of information. Each block is provided with a Cyclic Redundancy Check ("CRC" hereinafter) portion. CRC is a standard technique used for determining whether the data signal processed by receiver 15 includes errors so as not to correspond to the data signal as transmitted. Block redundancy is used for error correction. The transmitter repeatedly sends the same block of the data signal within a certain interval of time to insure that the receiver is able to capture the block correctly. Preferably, the transmission is done continuously so that the last bit of the block is immediately followed by the first bit of the block.

Each block is made up of several portions each of which of which has a distinct purpose. An explanatory rendering of the protocol format is provided below.

| HEADER | SYSTEM EXCLUSIVE | MESSAGE | CRC |
|---|---|---|---|
| [- - 7 bytes - -] | [ 3 bytes ] | [- - - - - 20 bytes - - - - -] | [2 bytes] |

As is readily observable from the above, each block contains 32 bytes of information, with each byte having 8 bits. The header portion is allocated a total of 7 bytes. It is used to help synchronize the receiver to the data signal and to alert the receiver to the existence of a data signal on its particular radio station and subcarrier. The header portion includes 1 sync byte and six additional bytes representing six ASCII characters. The sync byte is used to flag the beginning of a block and to assist the receiver in locking-on to the data signal. Its value is assigned to be unique with respect to the rest of the data bytes in the block. In other words, the value used for the sync byte will not be found anywhere else in the block. Thus, the receiver can use the unique sync byte to quickly determine the start of a data signal block. The next six characters are selected to form a predesignated identification signal ("ID signal" hereinafter) indicative of the fact that a message is to follow. That is to say, the ID signal is not related to a particular message. Its function is to alert the receiver to the fact that a data signal, regardless of the message and control signals which are a part of it, exists on this particular SCA carrier of this particular radio station. One example of the sync byte is the binary signal 11111111. One arbitrary example of the ID signal is the set of ASCII characters for "ZEPHYR".

The portion of the protocol format immediately following the header portion is known as the system exclusive. It is allocated 3 bytes in the block. The function of these bytes is explained in the listing which follows immediately below.

Byte 1: Global System Information

| Bits | Function | How it is used |
|---|---|---|
| 7 | Reserved | Future use |
| 6 | Reserved | Future use |
| 5 | Reserved | Future use |
| 4 | Reserved | Future use |
| 3 | User bit 3 | Message user group ID. These |
| 2 | User bit 2 | bits determine which receivers |
| 1 | User bit 1 | are allowed access to the current message. |
| 0 | User bit 0 | Denotes global message |

The need for and utilization of a message user group ID is explained below.

Byte 2: Block Info.

| Bits | Function | How it is used |
|---|---|---|
| 7 | Msg. type bit 3 | Msg. type. These bits deter- |
| 6 | Msg. type bit 2 | mine what type of block this is. |
| 5 | Msg. type bit 1 | Currently there is only type 0. |
| 4 | Msg. type bit 0 | |

Depending on the message type, the next twelve bits can have different and specific meanings. This allows for dynamic growth of the overall system into the future. The remaining definitions for the rest of byte 2 and for byte 3 shown below are for message type 0 only.

Byte 2: Message Specific Data - Message Type 0

| Bits | Function | How it is used |
|---|---|---|
| 3 | Reserved | Future use |
| 2 | Reserved | Future use |
| 1 | Load mode | PUSH/NORMAL |
| 0 | Display line | Display line destination for message. |

| Bits | Function | How it is used |
|---|---|---|
| | Byte 3: Message Specific Data - Message Type 0 | |
| 7 | SCROLL SPEED | 1 = fast, 0 = slow |
| 6 | EFFECTS SPEED | 1 = fast, 0 = slow |
| 5 | DIRECTION | 1 = scroll left, 0 = scroll right |
| 4 | CLEAR-ON-LOAD | 1 = clear display unloading, 0 = no clear |
| 3 | SCROLL-ON-LOAD | 1 = scroll unloading, 0 = replace |
| 2 | SCROLL DISPLAY | 1 = scroll while displaying, 0 = no scroll |
| 1 | FLASH-ON-LOAD | 1 = flash while loading, 0 = no flashing |
| 0 | FLASH DISPLAY | 1 = flash while displaying, 0 = no flashing. |

The next portion of the protocol format allocates 20 bytes to the text of the message for one message line. Each byte corresponds to an ASCII character. Each group of 20 bytes corresponds to 1 message line which, in turn, corresponds to the 20 characters designated as being the maximum accommodatable by display 29, as discussed above. Accordingly, each set of attributes as designated by the system exclusive bytes is particular to its companion message signals within the block.

The final portion of the protocol format consists of 2 bytes allocated to the CRC. The CRC value is derived from processing each byte of the entire block, "on the fly" through a standard CRC algorithm as the PC transmits a block to the SCA modulator. CRC techniques are described in the Zilog Z8 Handbook, p.255, and in the book *Error Control Techniques for Digital Communication* by Michaelson and Levesque, and published by Wiley and Sons. The derived CRC value is then expressed with the two bytes allocated to the CRC portion at the tail end of the block. At receiver 15, the detected bytes from the received data signal are similarly processed through the same CRC algorithm to calculate a detected CRC value for the particular block being received. If the CRC value calculated by the receiver matches the CRC bytes received at the tail end of the block, it is established that the block has been received error free. However, if the received CRC value and the calculated CRC value disagree, then the current block is ignored, and the receiver awaits the subsequent block.

Figure 3:
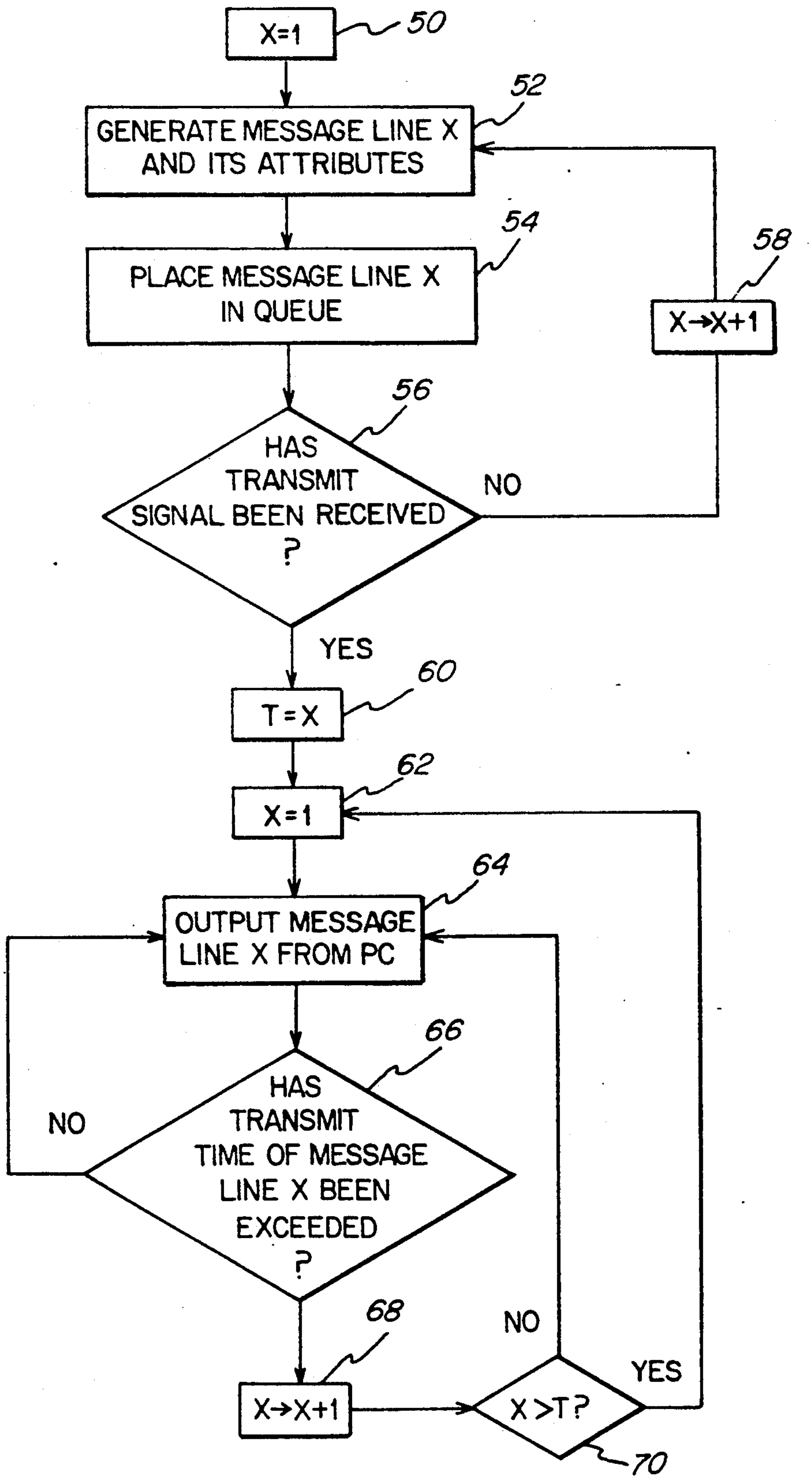
FIG. 3 is a flow chart describing repeated generation of a message by transmitter.

FIG. 3 depicts a flow chart describing how the PC generates a message which may require a multiplicity of display lines to be displayed in its entirety. In other words, the entire message may involve more than 20 characters. As indicated above, each line is transmitted repeatedly in order to provide block redundancy which is beneficial for error minimization. Thus, the PC must not only transmit each message line repeatedly, but must also proceed from the transmission of each message line to the next until all of the message lines are transmitted. This operation involves first storing all of the message lines sequentially in a queue. Each message line is assigned a number X. The operation begins with instruction 50 which sets X=1. Instruction 52 generates message line X which corresponds to a block of the data signal including a particular portion of the message along with its selected attributes. Message line X is set by instruction 54 into its sequential position place within a queue. Once the entire message has been generated and stored, message line by message line, the PC provides a TRANSMIT signal indicative of such a state. Decision box 56 then determines whether the TRANSMIT signal has been received. If not, then the value of X is increased by one with instruction 58 to generate and store the next message line. If, however, the TRANSMIT signal has been received, then the flow proceeds to instruction 60 which assigns the last, i.e. highest, value of X to T. The value of T represents the total number of message lines stored in the queue.

With the storage operation into the queue now being completed, the value of X is again set at 1 by instruction 62. The task now at hand is to output the message, first repeatedly for each line and, then, to complete the output of all of the lines in the same manner. This is initiated by the user depressing a button which generates a TRANSMIT signal as soon as the queuing operation is completed. Then, instruction 64 outputs the first message line from data generator 3 (i.e. from the PC) to SCA generator 5. As explained above, the block which is representative of message line X is to continue to be output from the PC as long as the assigned TRANSMIT TIME is not exceeded. To this end, box 66 compares the amount of time for which message line X has been transmitted against the assigned TRANSMIT TIME. If the TRANSMIT TIME has not been exceeded, the flow returns to instruction 64. When, however, the TRANSMIT TIME is eventually exceeded, then the flow proceeds to instruction 68 which increases the value of X by 1. That value is then compared in decision box 70 against the total number of message lines T stored in the queue, as explained above. If X does not exceed T, that indicates that more message lines remain in the queue. Consequently, flow returns to instruction 64 which then triggers the retrieval of the next message line from the queue. That message line is then treated in the manner just-described above. When, however, decision box 70 reveals that the last message line from the queue has been retrieved, the transmission of the message can either be stopped, or the entire message can again be transmitted starting with block No. 1. The loop depicted in FIG. 3 sets up the latter operation. Specifically, the positive output from decision box 70 circles back to instruction 62 which sets the value of X=1. That means that the first message line in the queue will again be retrieved after transmission of the entire message has been completed. Then, all the message lines in the queue will again be output, in the manner already described above. This cycling of the message continues until it is stopped by the operator.

With the data signal having been generated and transmitted in the manner discussed above with regard to FIG. 3, receiver 15 detects it and a corresponding digital signal is produced by SCA detector 25 in the manner discussed above. Decoder 27 then processes that signal in accordance with the flow chart depicted in FIG. 4. Specifically, box 80 represents the receipt from SCA detector 25 of its output signal. Decoder 27 then determines, in accordance with decision box 82, whether the ID signal has been received. In other words, after the sync pulse is detected, decoder 27 searches for the predesignated combination of six characters, namely "ZEPHYR". If that ID signal is not found, the operation returns to box 80 to await the receipt of the next block of data. However, if the ID signal is found at the input of decoder 27, the remainder of the block is detected and stored in memory per box 84. In addition, box 86 carries out a calculation of the CRC value in the manner described above. Decision box 88 compares the calculated CRC value with the value of the received CRC bytes. If the two values are not equal, then it is determined that the data signal has been erroneously received, and the operation is returned to box 80. If, however, the two values are in agreement, the received block of data is taken as being error free. Then, decision box 90 determines whether the just-received block contains a message which has already been previously received. This involves a comparison between the message just stored and a message previously stored and used for display. The previously received message is stored in a buffer, and its bits are compared with those in the newly received message in a conventional way. If the two are the same, the message already in memory is retained for continuing display. However, if a new message is detected, a display buffer is updated with the new message line, in accordance with box 92. Subsequently, instruction 94 causes the newly stored message line to be display on display 29.

Figure 4:
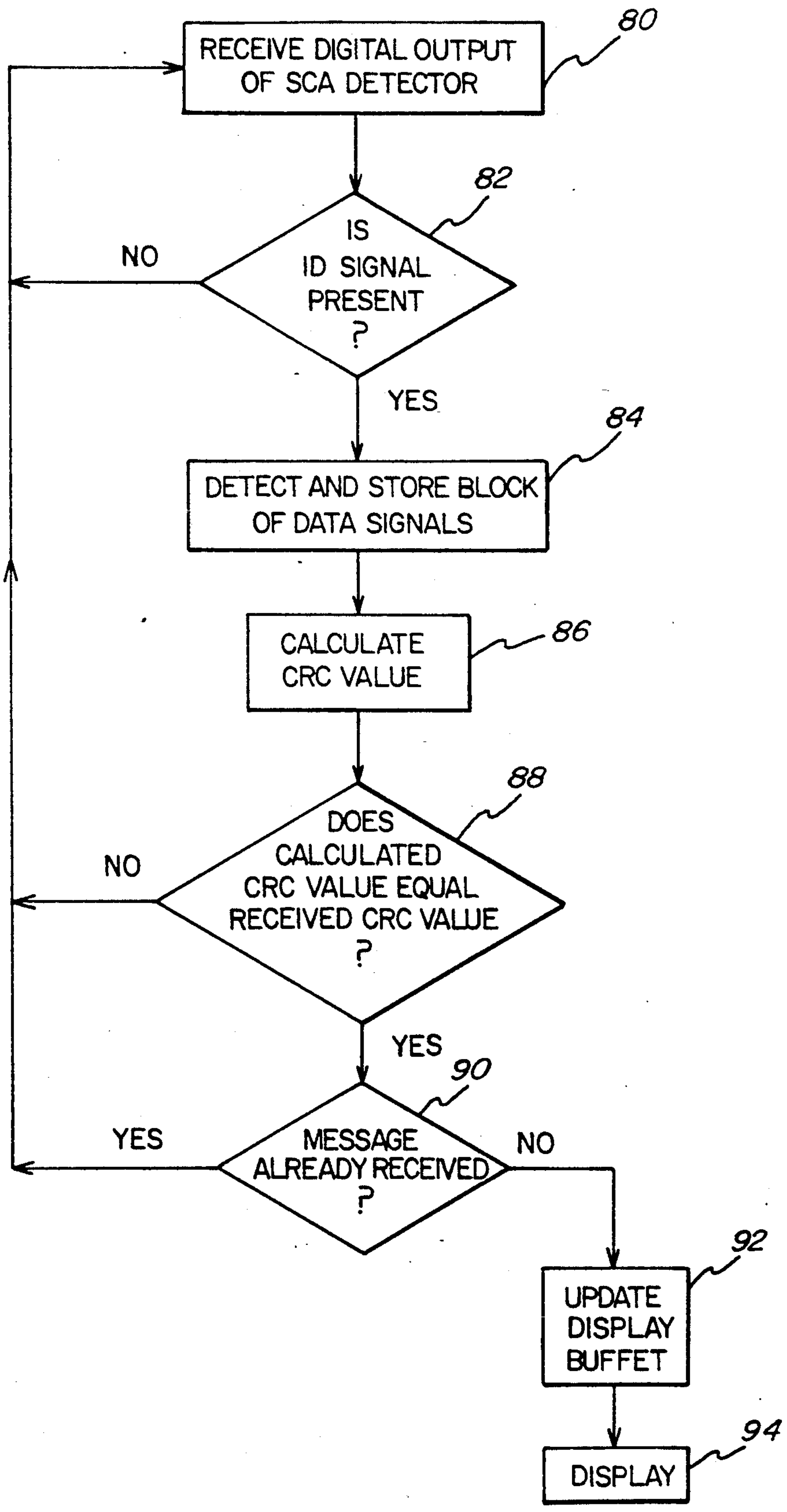
FIG. 4 is a flow chart describing the operation of the receiver.

It should be clear from the description provided just above of the transmitter operation with respect to FIG. 3 and the receiver operation with respect to FIG. 4, that the transmission and display of a "live", i.e. dynamic, message is made possible. The transmitter is provided with the capability of transmitting a plurality of message lines sequentially. These message lines can be components of a long message, or they can be a plurality of messages, as desired. The transmitter is highly flexible in terms of the messages which it can generate, store in a queue, and then transmit. Likewise, the receiver is capable of receiving each individual message line and retaining it for display as long as a new message line, different from the existing one, is not received. However, it is also capable of recognizing when a new message line has been detected. In such a case, the new message line is utilized to update the display by replacing the existing message line, scrolling, flashing, etc.

Figure 5:
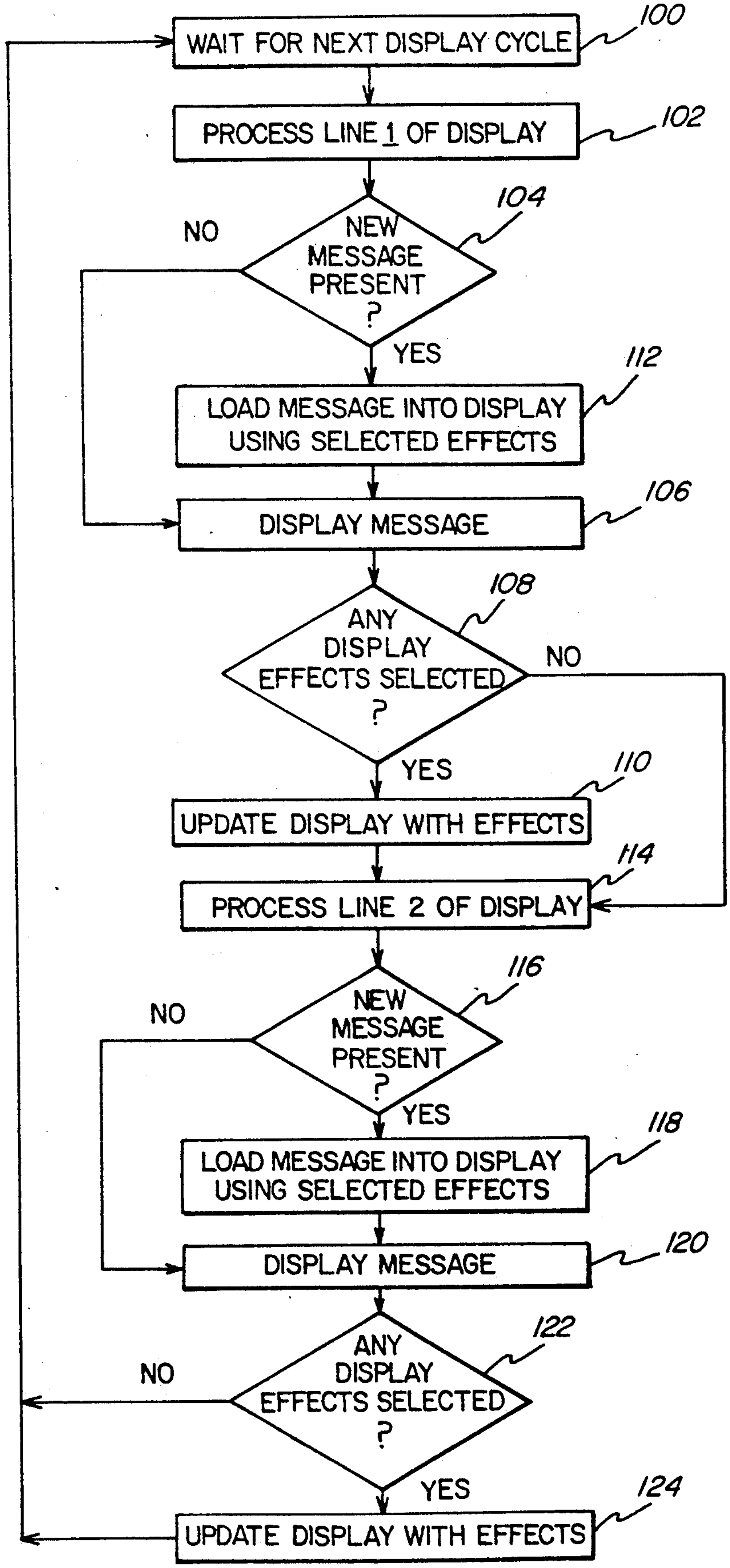
FIG. 5 is a flow chart describing how the receiver is controlled to display a message in various selected ways on a two line display device.

FIG. 5 is an expanded version of the processing performed by boxes 90, 92 and 94 depicted in FIG. 4. In particular, FIG. 5 shows the detailed steps involved in displaying message lines on both lines of display 29. Instruction 100 is part of the timing cycle with which the various tasks of decoder 27 are accomplished. The establishment of such timing cycles is conventional and, therefore, needs no additional details. When the start of a display cycle occurs, the message line received first in the data signal is processed in accordance with instruction 102. After determining whether the first message line received in this display cycle is the same as a message stored previously, decision box 104 routes the operation to instruction 106 if no new message is detected. Instruction 106 causes the message line to be input to display 29. Decision box 108 determines whether any attributes regarding display effects are part of the block to which the current message text belongs. If an attribute is detected, it is utilized in box 110 to control the display, such as by flashing or scrolling, for example. If decision box 104 detects a new message, then box 112 inputs that, by virtue of instruction 106, to display 29. Then, operations 108 and 110 are carried out in the same manner as already discussed above. If decision box 108 determines that no display effects were provided as attributes, then the flow proceeds to instruction 114 with regard to the second message line to be processed for that particular display cycle. The flow is also added to instruction 114 after instruction 110 is completed. Operations 116, 118, 120, 122 and 124 which follow correspond to previously discussed operations 104, 112, 106, 108, and 110, respectively. The only difference between the two sets of operations involves decision boxes 108 and 122. Whereas the former routes the operation to a processing of the second message line, the latter routes the operation back to instruction 100 to await the next display cycle.

With the operation depicted in FIG. 5, it is clear that each display cycle is designed to handle two message lines corresponding to the two lines of display 29. Each of the two message lines is processed individually to determine its message content and to identify and implement whatever attributes were assigned to it.

As has been explained above, the PC provides at its output ASCII characters corresponding to the selected message and attributes picked by the user. The resulting digital 8-bit signals will have an average DC voltage of some magnitude, with that magnitude being dependent on the particular message and attributes selected. However, a signal with an average DC voltage component transmitted from data generator 3 to SCA generator 5 has certain disadvantages. For example, it cannot be used on SCA generators which have an AC coupled input circuit or require zero volts DC average. Also, it should be noted that frequency shift keying (FSK) is preferably used as a modulation technique on the SCA carrier.

The use of frequency shift modulation (FSK) of the SCA carrier by the data signal requires that the receiver SCA detector be accurately tuned to the transmitted SCA signals if the receiver is required to detect very low frequency or DC changes in the SCA carrier. This is because the SCA decoder has an FM detector with a voltage output proportional to frequency deviation in a comparator following the detector to detect frequency excursions greater than a preset threshold. The comparator produces the logic signal output 1 when the frequency changes in one direction and 0 where it changes in the other direction. If the comparator is directly coupled to the FM detector, the frequency error in either the receiver or the transmitter will result in a different threshold for positive and negative frequency excursions. This will result in more errors in the data when noise is present If, however, the comparator can be AC coupled to the FM detector or has some means of setting the center voltage of its threshold to the center frequency of the SCA carrier, this problem can be avoided. This is possible only when the average frequency excursion of the SCA carrier is zero. This occurs when the data signal to the transmitter SCA generator has a zero or approximately zero average DC voltage.

The above-mentioned disadvantages can be avoided by providing a zero average signal at the output of data generator 3. Accordingly, one aspect of the present invention accomplishes just that. Specifically, the ASCII signals are converted by a specific code into other binary signals which, over a reasonable amount of time, will provide an average DC level of zero. This is accomplished by selecting a code which will convert the ASCII characters into a sequence of bytes with roughly the same number of ones and zeroes being input to the SCA generator 5. A conversion table for this purpose is provided below. Converted values with an equal number of ones and zeroes have been assigned to those ASCII characters which are used most often. Other less often used ASCII characters are assigned converted values which have almost an equal number of ones and zeroes. Conversion values which do not have a good balance of ones and zeroes are not used. Although the zero averaging does not function perfectly, the preferred SCA generator 5 has an automatic frequency control circuit with a relatively long time constant, and can therefore tolerate a reasonable amount of "offset" in the driving signal. Over time, any offset errors due to the imperfection of the encoding/decoding scheme have a tendency to balance out to zero.

The following table is used by the PC of data generator 3 to encode the ASCII data into converted data. The conversion table is stored in memory and accessed with control software the design of which is readily apparent to one with ordinary skill in the art. Accordingly, no further details of such software are provided. In operation, the PC software first subtracts 32 from the ASCII value, and uses the modified value to index into the encoding look-up table to extract the converted character values. This is done because ASCII characters 0 to 31 are not useful in generating the types of message one would normally use in this environment. For the sake of convenience, hexadecimal rather than binary numbers are used in the encoding table. Each hexadecimal character is denoted by "%" which precedes it. Each line listed below shows four entries in the table with the corresponding ASCII values on the right and the converted values on the left. Thus, taking the first line, hexadecimal CA (binary 11001010) corresponds to a blank space in ASCII. Hexadecimal 07 (binary 00000111) corresponds to an exclamation mark.

-continued

ENCODING TABLE

| | | | | | |
|---|---|---|---|---|---|
| %5C, %63, %65, %66 | => | ‘X’ | ‘Y’ | ‘Z’ | ‘[’ |
| %69, %6A, %6C, %71 | => | ‘ ’ | ‘]’ | ‘ ’ | ‘_’ |
| %72, %74, %78, %87 | => | ‘‘’ | ‘a’ | ‘b’ | ‘c’ |
| %8B, %8D, %8E, %93 | => | ‘d’ | ‘e’ | ‘f’ | ‘g’ |
| %95, %96, %99, %9A | => | ‘h’ | ‘i’ | ‘j’ | ‘k’ |
| %9C, %A3, %A5, %A6 | => | ‘l’ | ‘m’ | ‘n’ | ‘o’ |
| %A9, %AA, %AC, %B1 | => | ‘p’ | ‘q’ | ‘r’ | ‘s’ |
| %B2, %B4, %B8, %C3 | => | ‘t’ | ‘u’ | ‘v’ | ‘w’ |
| %C5, %C6, %C9, %37 | => | ‘x’ | ‘y’ | ‘z’ | ‘{’ |
| %38, %3B, %3D | => | ‘ ’ | ‘}’ | ‘~’ | |

The following decoding table is used by decoder 27 of receiver 15 to decode incoming messages from the converted characters back into ASCII data. The 8-bit value input by SCA detector 25 to decoder 27 is directly used to "index" this table. For the sake of convenience, the rows and columns of the decoding table have been labelled to show the hexadecimal values used to access the table. The "high nibble" value refers to the first of the two hexadecimal characters, while the "low nibble" value refers to the remaining character. Thus, in the following table, if the detected signal corresponds to hexadecimal % 36 (i.e. high nibble is 3 and low nibble is 6), that will be converted to the ASCII value for the character "K".

DECODING TABLE

| HIGH NIBBLE | LOW NIBBLE VALUE | | | | | | | | | | | | | | | |
|---|---|---|---|---|---|---|---|---|---|---|---|---|---|---|---|---|
| VALUE | -0- | -1- | -2- | -3- | -4- | -5- | -6- | -7- | -8- | -9- | -A- | -B- | -C- | -D- | -E- | -F- |
| -0- | —, | —, | —, | —, | —, | —, | —, | ‘!’ | —, | —, | —, | ‘‘’, | —, | ‘#’, | ‘$’, | ‘@’ |
| -1- | —, | —, | —, | ‘%’, | —, | ‘&’, | ‘,’, | ‘A’, | —, | ‘(’, | ‘)’, | ‘B’, | ‘*’, | ‘C’, | ‘D’, | ‘+’ |
| -2- | —, | —, | —, | ‘,’, | —, | ‘—’, | ‘.’, | ‘E’, | —, | ‘/’, | ‘:’, | ‘F’, | ‘-’, | ‘G’, | ‘H’, | ‘<’ |
| -3- | —, | ‘=’, | ‘>’, | ‘I’, | ‘?’, | ‘J’, | ‘K’, | ‘{’, | ‘ ’, | ‘L’, | ‘M’, | ‘}’, | ‘N’, | ‘~’, | —, | — |
| -4- | —, | —, | —, | —, | —, | —, | —, | ‘O’, | —, | —, | —, | ‘P’, | —, | ‘Q’, | ‘R’, | — |
| -5- | —, | —, | —, | ‘S’, | —, | ‘T’, | ‘U’, | —, | —, | ‘V’, | ‘W’, | —, | ‘X’, | —, | —, | — |
| -6- | —, | —, | —, | ‘Y’, | —, | ‘Z’, | ‘[’, | —, | —, | ‘ ’, | ‘]’, | —, | ‘ ’, | —, | —, | — |
| -7- | —, | ‘_’, | ‘‘’, | —, | ‘a’, | —, | —, | —, | ‘b’, | —, | —, | —, | —, | —, | —, | — |
| -8- | —, | —, | —, | —, | —, | —, | —, | ‘c’, | —, | —, | —, | ‘d’, | —, | ‘e’, | ‘f’, | — |
| -9- | —, | —, | —, | ‘g’, | —, | ‘h’, | ‘i’, | —, | —, | ‘j’, | ‘k’, | —, | ‘l’, | —, | —, | — |
| -A- | —, | —, | —, | ‘m’, | —, | ‘n’, | ‘o’, | —, | —, | ‘p’, | ‘q’, | —, | ‘r’, | —, | —, | — |
| -B- | —, | ‘s’, | ‘t’, | —, | ‘u’, | —, | —, | —, | ‘v’, | —, | —, | —, | —, | —, | —, | — |
| -C- | —, | —, | —, | ‘w’, | —, | ‘x’, | ‘y’, | —, | —, | ‘z’, | ‘ ’, | —, | ‘0’, | —, | —, | — |
| -D- | —, | ‘1’, | ‘2’, | —, | ‘3’, | —, | —, | —, | ‘4’, | —, | —, | —, | —, | —, | —, | — |
| -E- | —, | ‘5’, | ‘6’, | —, | ‘7’, | —, | —, | —, | ‘8’, | —, | —, | —, | —, | —, | —, | — |
| -F- | ‘9’, | —, | —, | —, | —, | —, | —, | —, | —, | —, | —, | —, | —, | —, | —, | — |

Hexadecimal 0B (binary 00001011) corresponds to a quotation mark. Hexadecimal 0D (binary 00001101) corresponds to a number symbol. As will be noted, the often used "blank" space has been assigned an equal number of ones and zeros, whereas the other three symbols which are much less frequently used have an almost equal number of zeroes and ones.

ENCODING TABLE

| | | | | | |
|---|---|---|---|---|---|
| %CA, %07, %0B, %0D | => | ‘ ’ | ‘!’ | ‘‘’ | ‘#’ |
| %0E, %13, %15, %16 | => | ‘$’ | ‘%’ | ‘&’ | ‘,’ |
| %19, %1A, %1C, %1F | => | ‘(’ | ‘)’ | ‘*’ | ‘+’ |
| %23, %25, %26, %29 | => | ‘,’ | ‘—’ | ‘.’ | ‘/’ |
| %CC, %D1, %D2, %D4 | => | ‘0’ | ‘1’ | ‘2’ | ‘3’ |
| %D8, %E1, %E2, %E4 | => | ‘4’ | ‘5’ | ‘6’ | ‘7’ |
| %E8, %F0, %2A, %2C | => | ‘8’ | ‘9’ | ‘:’ | ‘;’ |
| %2F, %31, %32, %34 | => | ‘<’ | ‘=’ | ‘>’ | ‘?’ |
| %0F, %17, %1B, %1D | => | ‘@’ | ‘A’ | ‘B’ | ‘C’ |
| %1E, %27, %2B, %2D | => | ‘D’ | ‘E’ | ‘F’ | ‘G’ |
| %2E, %33, %35, %36 | => | ‘H’ | ‘I’ | ‘J’ | ‘K’ |
| %39, %3A, %3C, %47 | => | ‘L’ | ‘M’ | ‘N’ | ‘O’ |
| %4B, %4D, %4E, %53 | => | ‘P’ | ‘Q’ | ‘R’ | ‘S’ |
| %55, %56, %59, %5A | => | ‘T’ | ‘U’ | ‘V’ | ‘W’ |

In order to implement this technique, the PC of transmitter 1 is provided with suitable data and software. Likewise, the corresponding information and software are loaded into decoder 27 of receiver 15. The processing steps of data generator 3 and decoder 27 are augmented from the version shown in FIGS. 3 and 4, respectively, in order to encode and decode the data signal. concerning the system exclusive bytes, three bits were mentioned as being devoted to a message group user ID. It is contemplated that for certain types of messages, it will be desirable that only a particular group is to receive it for display. In the example already touched upon earlier, volunteer firemen would be called to duty with a suitable alert signal. Such a signal, obviously, is meant for only that group of radio listeners, namely volunteer firemen. It is, therefore, not desirable for all of the radio listeners to receive that alert signal. Other examples can readily come to mind. Consequently, the bits allocated for this purpose in the transmitter correspond with bits preset for a particular user group in their personal receivers. Thus, if the volunteer firemen group is assigned the binary value of 101, when this group is to be addressed by a particular message the three bits allocated for this purpose in byte 1 of the system exclusive bytes will also be designated 101. In order to implement this technique, decoder 27 is provided with the capability of processing the incoming message user group ID and comparing it to one previously stored therein. If a match is found, then the message is stored and displayed. Otherwise, the message is ignored by decoder 27.

Figure 6:
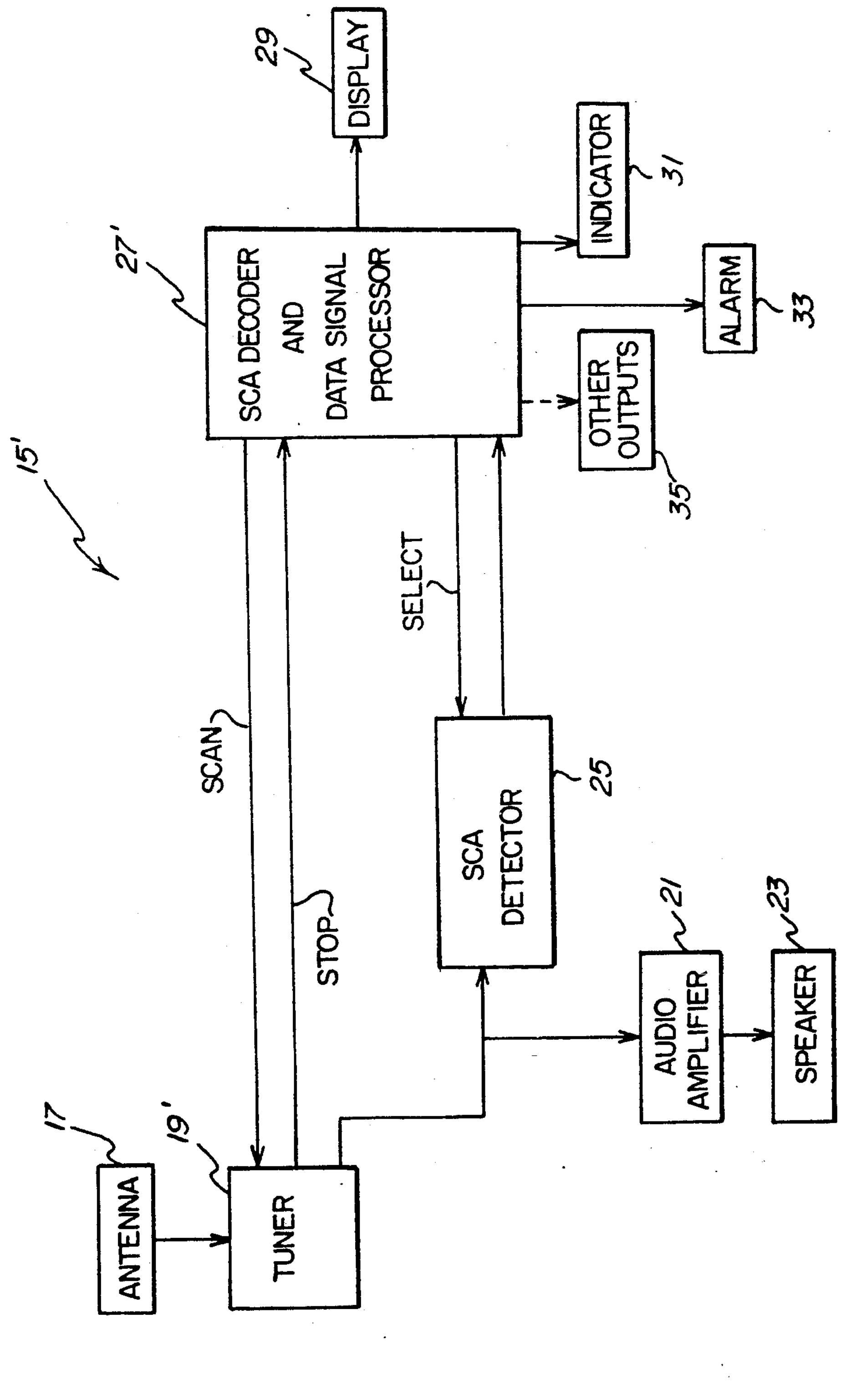
FIG. 6 is a block diagram of another embodiment of the receiver capable of scanning a broadcast band for automatically finding the station which is broadcasting the message.

FIG. 6 depicts another embodiment of receiver 15. Search receiver 15' is capable of automatically scanning the FM frequency band under the control of decoder 27 rather than having to be manually manipulated from station to station. Tuner 19' is of the digital variety capable of having its tuning frequency controlled by an electrical signal. Such tuners are well known. An example would be the tuner included in the Nakamichi TMI automobile radio.

Those components in FIG. 6 which are similar to corresponding components in FIG. 2 are numbered with the same numerals. Thus, antenna 17 provides a received signal to tuner 19'. Audio amplifier 21 receives the composite signal output by tuner 19', and inputs it to speaker 23. SCA detector 25 separates the received data signal from the main carrier and inputs it to decoder 27'. Display 29, indicator 31, alarm 33, and the other outputs identified generally as 35 correspond to those discussed in detail above with respect to the embodiment depicted in FIG. 2.

The two main components of the search receiver 15' which deserve additional attention are tuner 19' and decoder 27'. When an automatic band scanning operation is desired, decoder 27' inputs a SCAN instruction to tuner 19'. Tuner 19' includes circuitry for detecting and responding to that signal to generate an automatic scanning operation which seeks out active stations radiating a detectable signal in that locality. When such an active station with a sufficiently strong main carrier signal is found, tuner 19' inputs a STOP signal to decoder 27'. Upon the receipt of a STOP signal, decoder 27' initiates the same operation as that described in detail above with respect to the FIG. 2 embodiment. Specifically, SCA detector 25 determines whether there is any signal modulated on the SCA carrier. If there is, then a determination is made of whether the ID signal is present. If such an ID signal is found, then the signal decoding and processing operations described above are carried out by decoder 27. If an SCA carrier is not detected at that station, or no ID signal is received, decoder 27' sends a SCAN signal again to tuner 19' so that further scanning of the FM band can take place to the next station. In this manner, the FM band is scanned until a station is found which transmits the ID signal being sought. At that point, decoder 27' no longer generates a SCAN signal, and tuner 19' therefore remains tuned to that station.

A further enhancement of the search receiver 15' involves the possibility that a station may be transmitting information on a plurality of SCA carriers. For example, it is not unlikely that two SCA carriers can be used by a station. These might be at 67 and 92 KHz. Therefore, search receiver 15' is provided with the capability of checking both SCA carriers at each station. For this purpose, decoder 27' generates a SELECT signal for input to SCA detector 25 by activating a switching device (not shown). This changes the detection frequency of SCA detector 25 when the data signal is not detected in order to toggle from one of the SCA carriers to the others.

Figure 7:
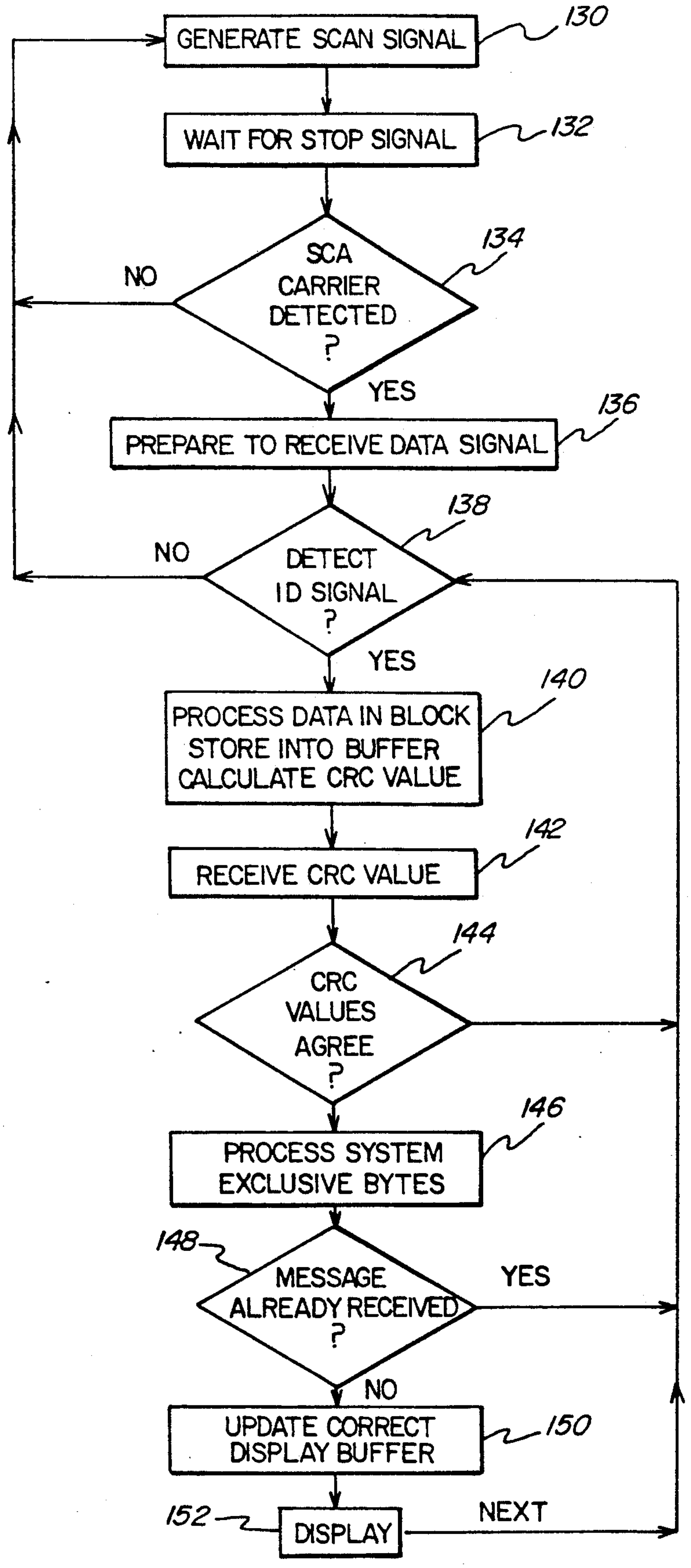
FIG. 7 is a flow chart describing how the receiver of FIG. 6 is controlled to scan the frequency band and to ensure the validity of the received message.

FIG. 7 shows a flow chart depicting how decoder 27 controls the operation of search receiver 15'. Box 130 represents the generation of the above-discussed SCAN signal to tuner 19'. Once tuner 19' is scanning in search of the next operable radio station, decoder 27 awaits receipt of a STOP signal, as per box 132. When that STOP signal is eventually received from tuner 19', decision box 134 represents a determination of whether a signal is detected on the SCA carrier. If not, then a further SCAN signal is generated to trigger tuner 19' into continuing its scanning operation. If, however, a signal is detected on the SCA carrier, instruction 136 sets decoder 27 to await receipt of the data signal in the form of a block, as discussed above. In particular, once a sync signal is detected, decision box 138 determines whether the six bytes which succeed the sync byte correspond to the ASCII values of ZEPHYR. If not, the flow returns to box 130. If, however, the ZEPHYR ID signal is detected, the ensuing system exclusive bytes and message bytes are stored into a buffer memory, and the CRC values of the bytes are calculated, as per box !40. Box 142 represents the detection of the transmitted CRC value which is then compared in decision box 144 with a calculated CRC value. If the two values do not agree, this indicates that an error has occurred, and the flow is returned to decision box 138. If, however, no error is detected, then box 146 represents the processing of the system exclusive bytes. For example, this is where the above-discussed user group ID would be processed. Decision box 148 provides an output indicative of whether the just-received message has previously been received. If it has, the operation is returned to decision box 138. If, however, the reception of a new message is indicated, the display buffer is updated by virtue of instruction 150 and displayed in accordance with instruction 152. Flow is then returned to decision box 138 under a NEXT command for the processing of the next block of data signal.

Figure 8:
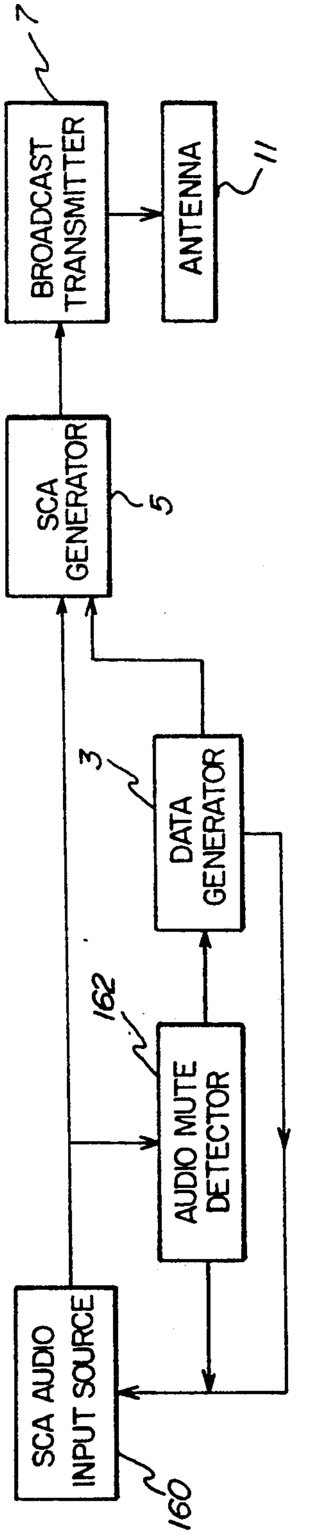
FIG. 8 is a block diagram of another embodiment of the transmitter capable of transmitting the message on a subcarrier frequency also being used for transmitting other information as well.
Figure 9:
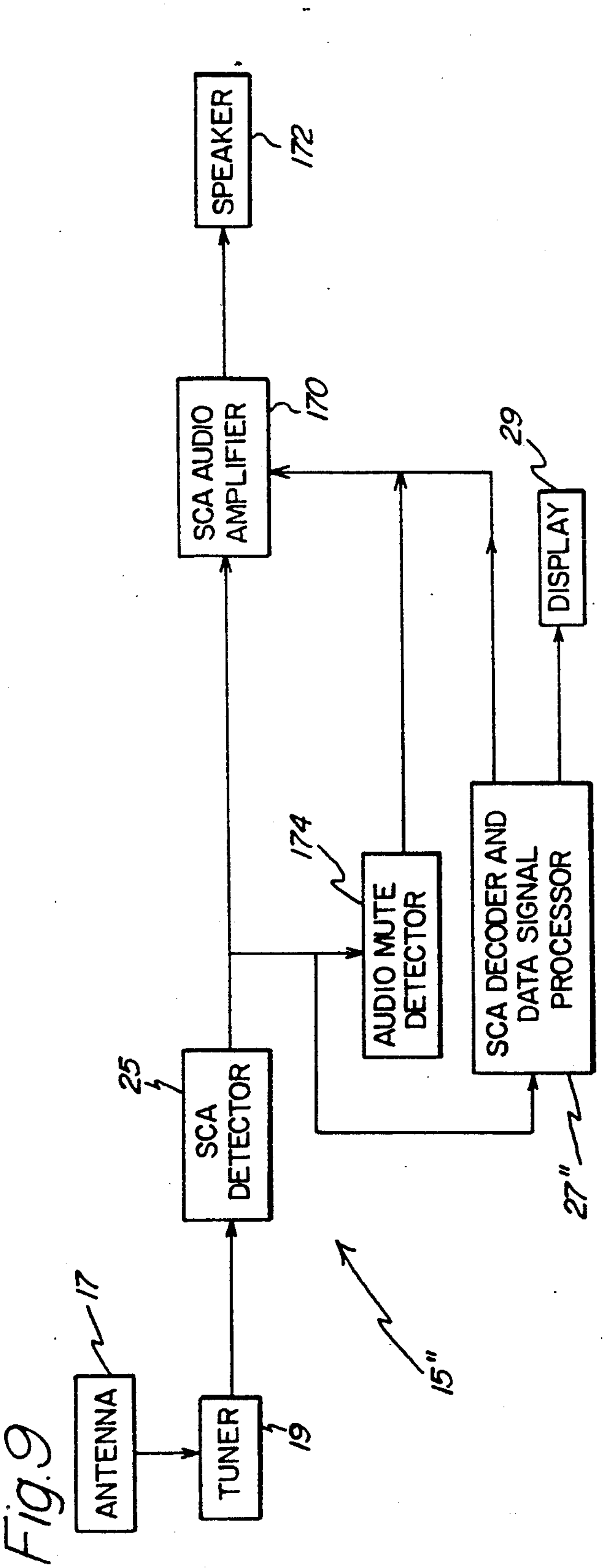
FIG. 9 is a block diagram of another embodiment of the receiver operable with the transmitter of FIG. 8.

A further variation of the invention is depicted in FIGS. 8 and 9. This variation is aimed at making it possible to share an SCA carrier between certain programming being transmitted thereon and the data signal. For example, a particular SCA carrier might already be in use for transmitting continuous background music. The particular radio station may not want to allocate a second SCA carrier solely for the task of transmitting the data signal. The latter would involve additional investment for at least another SCA generator, and the use of another SCA carrier would lower the power available for the main carrier. Accordingly, FIG. 8 depicts transmitter 1' having SCA audio input source 160 which provides, for example, the continuous music programming. Its output is provided to SCA generator 5. The same output is also provided to audio mute detector 162. This is a conventional circuit well known, for example, in the tape recording art where it is used to detect a blank space, or gap, on the tape. In the application to which it is put, audio mute detector 162 will sense any "dead time" beyond a certain duration when no signal from the audio program is detected, such as would occur between songs. Once such a "dead time" is detected, audio mute detector 162 generates an enable signal to data generator 3 which responds by immediately providing its data signal to SCA generator 5 in the manner described above with respect to the FIG. 1 embodiment. Thus, audio mute detector 162 ensures that the data signal from data generator 3 is input to SCA generator 5 only during the "dead time" in the music provided by SCA audio input source 160. SCA generator 5 provides its output to broadcast transmitter 7 which radiates the broadcast signal with antenna 11, as described above.

In order to insure that, once a "dead time" is detected, the data signal from data generator 3 is not interfered with by the signal from SCA audio input source 160, audio mute detector 162 also generates a pause signal which it inputs to SCA audio input source 160 to initiate blocking or inhibiting of the output of programming signals therefrom. The pause signal from audio mute detector 162 is designed to have a given duration before it resets itself to await the next "dead time". A suitable output signal is provided from data generator 3 to SCA audio input source 160 which will then keep SCA audio input source 160 in the inhibited mode for as long as the data signal is being sent, upon which time it will release the SCA audio input source and reset itself for the next "dead time". Since the PC is outputting the data signal at 1200 baud, approximately ½ sec. per line is required to transmit the blocks for two message lines.

FIG. 9 shows the modified receiver 15″ for operating in conjunction with the modified transmitter 1′ of FIG. 8. Specifically, antenna 17 provides the detected signal to tuner 19 for input to SCA detector 25 (for the sake of simplicity, audio amplifier 21 and speaker 23 are not shown). The detected SCA signal at the output of SCA detector 25 is provided to SCA audio amplifier 170 for driving speaker 172. Of course, for SCA audio amplifier 170 and speaker 172 audio amplifier 21 and speaker 23, respectively, can be used. The just-described arrangement enables the audio reproduction of whatever programming is being transmitted on the SCA carrier.

The detected SCA signal is also routed to audio mute detector 174. It corresponds to audio mute detector 162 disclosed above with respect to FIG. 8, and also has a predetermined duration which is longer than the delay time required by the decoder 27″ to react to the existence of an ID signal at its input. However, audio mute detector 174 has a shorter mute duration than that provided for audio mute detector 162 because, otherwise, some music would be missed if the transmitter were permitted to transmit before the receiver is ready to receive. When audio mute detector 174 senses a "dead time" in the SCA signal, it provides an inhibit control signal to SCA audio amplifier 170 to disable it from reproducing any sounds on speaker 172. This is necessary because, as explained above, the data signal is being transmitted during the mute period. Consequently, were the audio amplifier 170 to remain enabled, the digital data signal would be amplified and heard on speaker 172. However, with the disablement of SCA audio amplifier 170 during the mute period, no such interference occurs.

The detected SCA signal is also input to decoder 27″. Decoder 27″ functions precisely in the same way as decoder 27, with one addition. When a data signal is detected, decoder 27″ generates a message inhibit signal which is input to the SCA audio amplifier 170 to keep it disabled during the entire duration that a data signal is received. The received data signal is decoded and processed by decoder 27″ for input to data display 29. When transmission of the data signal is completed, the message mute signal is terminated to release the SCA audio amplifier 170 into its normal mode.

Although several embodiments of the present invention have been discussed in detail above, it will be readily apparent that several modifications thereto can be made. For example, audio mute detector 162 can be eliminated. Instead, source 160 would put out a low frequency (25–50 Hz) tone during the "dead time". Audio mute detector 174 would be replaced with a circuit to detect this tone. Also, the particular display device can be, for example, in the form of a one line, 16 character device or a two line, 24 character/line device both of which are readily available. The type of display used will determine the number of characters in the message portion of the blocks. These and other such modifications are all intended to fall within the scope of the present invention as defined by the following claims.

We claim:

1. Apparatus for transmitting and receiving a radio frequency signal, comprising:

radio program input means for providing a program signal on a main carrier frequency;

information signal generating means for providing an information signal normally continuously transmitted on a subcarrier frequency of the main carrier frequency, except for given time intervals;

data generating means for providing a data signal to be transmitted on said subcarrier frequency and including first means for determining said given time intervals when the information signal is not transmitted on said subcarrier frequency, and means for transmitting said data signal over said subcarrier frequency during said given time intervals;

transmitting means for normally combining the program signal and the information signal into a first composite signal, and for combining the program signal and the data signal only during at least a portion of the given time intervals to form a second composite signal;

receiver means for receiving the first and second radiated composite signals and separating them into a program signal component, a first subcarrier frequency component, and a second subcarrier frequency component;

second means for determining said given time intervals when the information signal is not present on the subcarrier frequency component;

speaker means for audibly reproducing the program signal component and the first subcarrier frequency component;

means for inhibiting said speaker means during at least a portion of the given time intervals; and display means for displaying a message corresponding to the data signal in the second subcarrier frequency component simultaneously with the audible reproduction of the program signal component.

2. The apparatus of claim 1, wherein said first and second means for determining the given time intervals comprise means for detecting a dead time in the information signal.

3. The apparatus of claim 1, wherein said inhibiting means prevents operation of the speaker means as long as the second subcarrier frequency component is being received by the receiver means.

* * * * *

UNITED STATES PATENT AND TRADEMARK OFFICE

CERTIFICATE OF CORRECTION

PATENT NO. : 5,146,612
DATED : September 8, 1992
INVENTOR(S) : Grosjean, et. al.

It is certified that error appears in the above-indentified patent and that said Letters Patent is hereby corrected as shown below:

On the Title page, item [73], Assignee: should be --James L. Spingarn
17 Wedgewood Court
Glen Head, NY 11545--

Signed and Sealed this

Twenty-eighth Day of June, 1994

Attest:

BRUCE LEHMAN

*Attesting Officer* *Commissioner of Patents and Trademarks*